Nov. 4, 1930.　　　　E. L. HOFFMAN　　　　1,780,190
PARACHUTE
Filed Aug. 28, 1929　　　　2 Sheets-Sheet 2
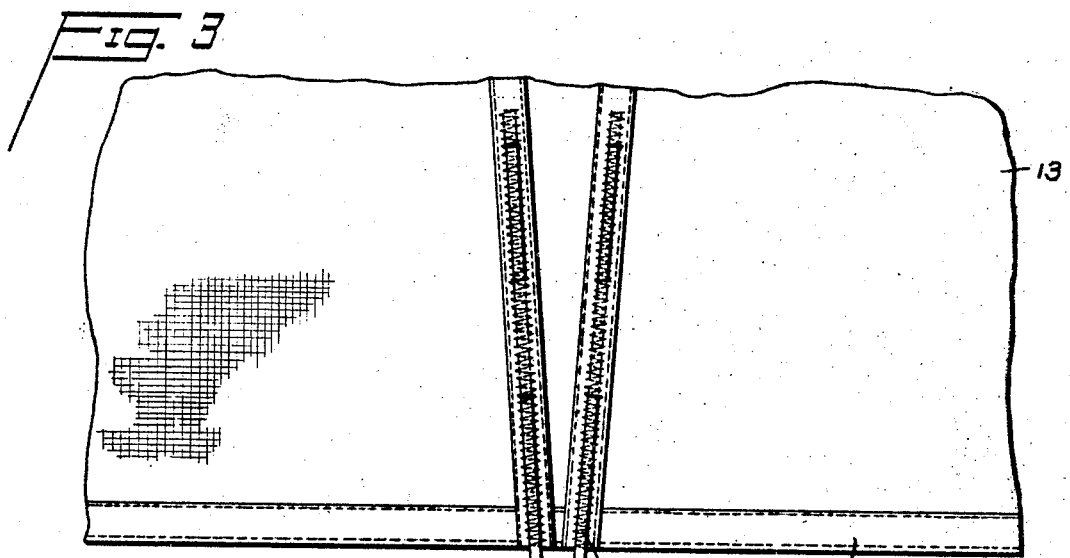
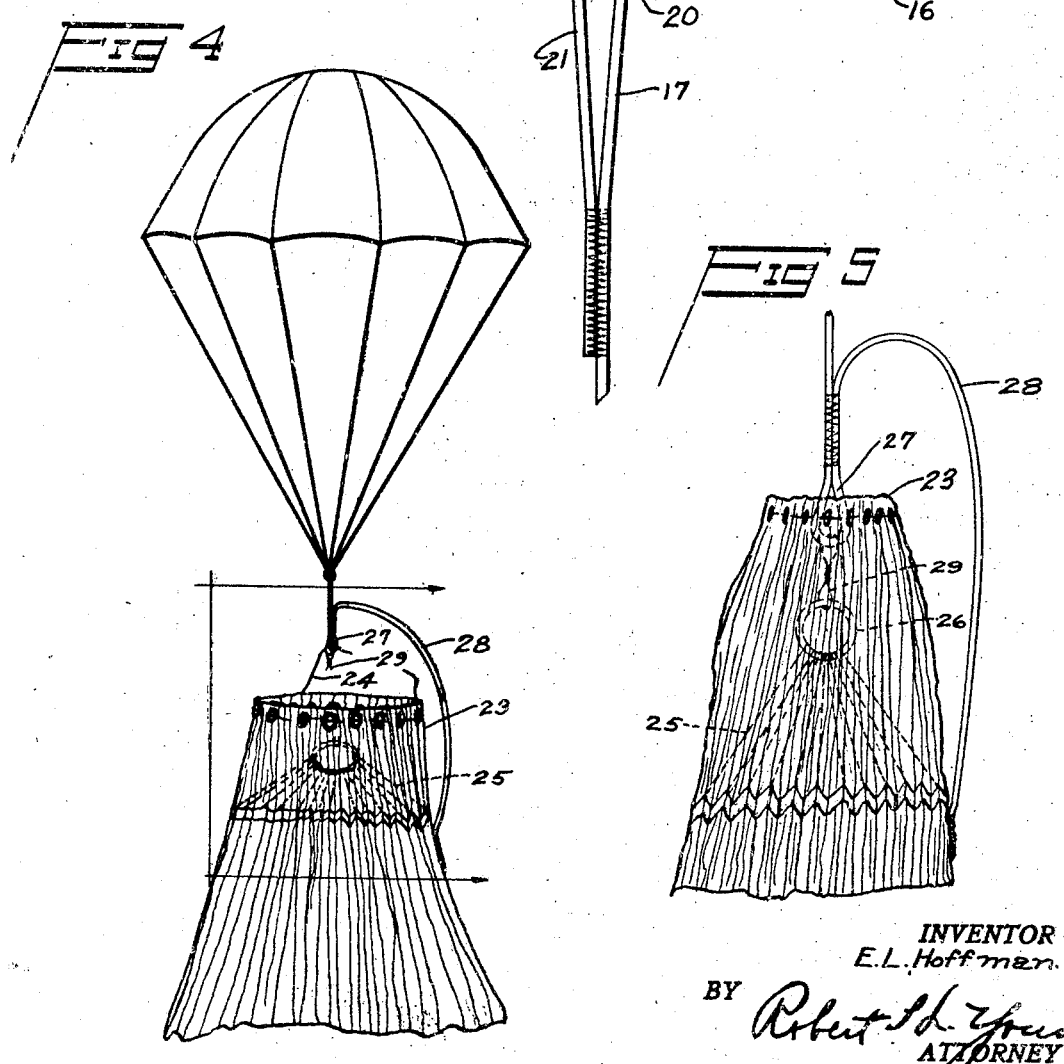
INVENTOR
E.L. Hoffman.
BY Robert L. Young
ATTORNEY Patented Nov. 4, 1930

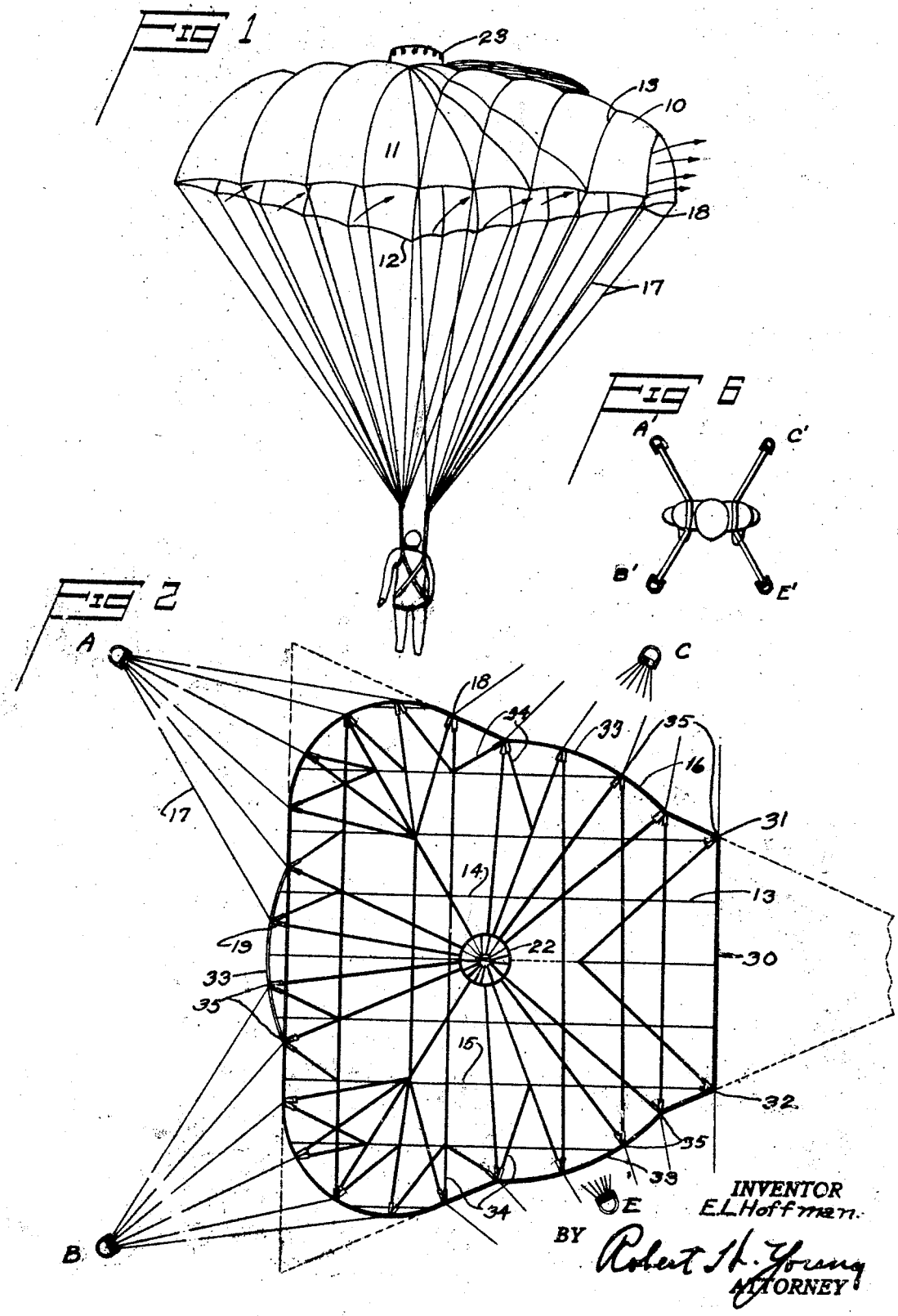

1,780,190

UNITED STATES PATENT OFFICE

EDWARD L. HOFFMAN, OF DAYTON, OHIO

PARACHUTE

Application filed August 28, 1929. Serial No. 389,055.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates generally to supporting parachutes for aeronautical use and more particularly to parachutes which are adapted to sustain an aviator while descending through the air. The principal object of the present invention is the provision of a parachute which will be positive in opening, shock absorbing at high speed and which will make use of the sustaining surface for a given amount of cloth in an efficient manner.

A further object of the invention is the provision of a parachute having a slow vertical rate of descent and one which will open promptly when launched at or in low air speeds.

Another object of the invention is the provision of a parachute which will be exceedingly stable in its descent through the air and having means inherent in its construction for preventing or damping oscillations and free from the objectionable breathing which is apparent in present day parachutes.

A still further object of the invention is the provision of means by which the parachute may be controlled or steered and the direction of descent governed manually without materially impairing its efficiency and without causing any undue oscillation of the descending aviator.

A still further object of the invention is the provision of a parachute having an automatically operated vent located at the top of the sustaining canopy so that when the parachute opens at high speed the sudden impact of the air is absorbed by the opening of the vent, the pressure is relieved, and tearing of the canopy is avoided.

Another object of the invention is to secure the shroud lines to the canopy in a manner such that the stresses set up during the use of the parachute will be more evenly distributed over the sustaining surface of the parachute than has been done by previously used suspension systems.

Finally the invention is characterized by the provision of a parachute, the canopy of which is substantially triangular in shape, the one end of which is funnel-shaped whereby to vent the air laterally and propel the parachute in a horizontal direction.

A parachute constructed in accordance with this invention, when exposed to an air stream, has a tendency to incline partially, which is due in part to the jet propulsion obtained through the tail opening and the peculiar aerodynamic characteristics of the canopy so that the load is carried forward of the center of area of the sustaining canopy.

It will be apparent from the above named objects that the general purpose of my invention is the achievement of a high degree of safety in the apparatus I have described.

At very high speeds the vent opening in the canopy used in present day construction cannot be large enough to permit the parachute to open gradually, as the air would exhaust out the vent as fast as it entered at the bottom. On the other hand a small vent cannot be used at high speeds since the fabric used in the canopy is not strong enough to sustain the shock of opening at high speeds.

Present day parachutes are quite difficult to steer and are slow to respond and often start to oscillate as soon as an attempt at steering is made. Oscillation in descent is very objectionable, often resulting in personal injury to the aviator. This lateral and longitudinal instability often causes the parachute to descend at a much faster rate for a given diameter and a given amount of sustaining surface than if the parachute were inherently stable.

This invention, therefore, has as its objects the correction of the various faults in the present day type of parachutes.

Other and further objects and advantages of the invention will be hereinafter fully set forth and explained in detail and the novel features thereof defined by the appended claims.

In the drawings:

Fig. 1 is a perspective of an open parachute, shaped in accordance with my invention.

Fig. 2 is a pattern of the canopy of the parachute which shows in detail the triangular shape of the canopy.

Fig. 3 is an enlarged detail view showing the improved method of attaching the suspension lines to the canopy.

Fig. 4 is an enlarged detail view showing the vent opening and the method of attachment of the pilot parachute to the canopy.

Fig. 5 is a view similar to Fig. 4 showing the vent in an unopened position, and Fig. 6 is a view showing the manner in which the suspension lines are carried to the harness of the aviator.

Referring more particularly to the drawings in which corresponding numerals designate like parts in the various figures, the parachute canopy in the embodiment of my invention herein illustrated consists of a sustaining portion 10 and an outer peripheral portion 11 which extends downwardly at its edge, as shown at 12. The parachute canopy is constructed of a plurality of panels 13 of a shape shown in Fig. 1, these panels being attached together by means of seams along the lines 14 and 15. Each panel is preferably made of a single piece of suitable material, the threads of the material being arranged in such a manner as to permit the selvaged edges of the material to be sewed together; thus forming the seams of adjacent panels.

The outer edges of the various panels have secured thereon a band or tape 16 of a material similar to the fabric of the canopy. Suspension cords 17 of any suitable number are attached in any desired manner at their lower ends to the weight or load or the suspension harness of the aviator. These cords are attached at points 18 along the peripheral edge of the canopy and to the band 16. The various seams by which the adjacent panels are attached together may be used as a means to enclose the suspension cords, or, if desired, the cords may be attached to the sustaining canopy at points intermediate the seams, reinforcing bands 19 being sewed to the canopy and extending upwardly to points converging toward the vent opening. The suspension cords at these points are sewed directly to the canopy and the band and are held together by means of cross-stitching 20 which zigzags along the cord and panel. A snubbing action will be, therefore, effected between the canopy and the peripheral band 16 so that the points of attachment of the suspension cords will not tear loose. To effect a more even distribution of the stresses imparted the suspension cords under load, the suspension cords are further reinforced by the provision of auxiliary shroud lines 21 sewed to the canopy and band at the points of attachment of each suspension line and arranged at an angle to each main suspension line whereby a substantial V-shaped opening is effected between the main suspension line and auxiliary shroud lines respectively. The auxiliary line is sewed to the main suspension line at a point adjacent the peripheral edge of the sustaining canopy. The result is that when the weight of the aviator comes upon the straps of the harness, it is transmitted not only to those portions of the lines that happen to be in contact with the harness straps but the stresses are divided between the main and auxiliary suspension lines; thus distributing more or less uniformly the load over the canopy generally.

The parachute canopy is provided with a vent opening 22, located approximately at the center of area of the main sustaining surface. The vent opening is normally restricted by use of a fabric collar 23 of cylindrical formation which is sewed or otherwise attached in any like manner to the edge of the vent opening. The upper portion of the collar is provided with a plurality of grommets through which are passed a cord 24 having a breaking strength of approximately fifteen pounds pressure by which means the upper portion of the collar is tied together. A plurality of cords 25 are provided which are attached to the edge of the vent opening at one end, the other ends being fastened to a ring-piece 26. The length of the cords 25 are less than the overall width of the collar so that when extended in a taut condition the top of the ring-piece 26 will lie below the top edge of the collar 23. The auxiliary or pilot parachute is attached to the ring-piece 26 by means of a thimble 27 around which is looped a snubbing line 28 attached to the pilot parachute at its one end, the other end of the line 28 being sewed to the top portion of the canopy. The ring-piece and thimble are securely held by turns of light wire 29 having a predetermined breaking strength, which, by experiment, has been found to be approximately sixty pounds pressure. The cord 24 heretofore mentioned is passed through the loop end of the thimble. From the foregoing, it will be evident that in the event of a high speed opening a pressure greater than sixty pounds being exerted by the pilot chute will effect a breakage of the wire 29 and in a like manner the breakage of the cord 24 to permit the collar 23 to open and vent the excess air through the top of the canopy.

Referring to Fig. 2, it will be seen that the canopy is cut off on the one end, as at point 30, and the suspension lines carried to the corners formed by the peripheral edge of the canopy and the cut-off portion; no suspension lines being between points 31 and 32. This arrangement effects a lateral vent or tunnel-like opening between the latter points of suspension to permit the air to vent laterally. The air venting out the so-called "tail portion" of the canopy gives in effect a jet propulsion to the parachute generally which is effective in causing the parachute to move through the air substantially horizontal and in a direction opposite to the direction of air flow out the tail of the parachute canopy.

The parachute canopy is provided with arcuate portions 33, the peripheral edges of which are arranged to be the same distance from the theoretical center of area of the canopy. A plurality of fabric bands 34 are attached at spaced points 35 to the edge of the aforementioned portions and are sewed to the canopy of the parachute and adapted to converge toward the point of attachment of the pilot chute whereby an even pull on all the suspension lines at these points is effected. This makes for rapid opening of the main canopy inasmuch as the pilot parachute cannot exert an even pull upon all of the suspension lines and the loose portions of the canopy will, as a result, readily catch the air. A parachute constructed in accordance with the present invention is two-directional; it will either tend to land with the tail portion or tunnel-opening upwind or downwind in that its shape gives it substantially a weathervane-construction action when struck by varying horizontal currents of air.

A parachute of the construction described is more readily steerable than the parachutes of present day construction in that the method of grouping the suspension lines and of attachment to the harness of the aviator permits of the parachute being rotated in either direction. The method of attachment of the suspension lines of the parachute will be more readily understandable by reference to Figs. 2 and 6 of the drawings wherein, for the purpose of illustration, the main canopy is shown as having a plurality of suspension lines which are equally divided into four groups and attached to D rings, which are, in turn, secured to the parachute harness, the D rings being identified respectively by letters A, B, C, and E. Referring more particularly to Fig. 6, it will be noted that the grouping designated by letter A are attached to the harness straps at point A'; the group B attached to the harness strap B', etc. From the foregoing, and by reference to the Figs. 1, 2, and 6, it will be obvious that the horizontal motion of the parachute will carry the aviator sideways, either to his right or left, rather than backward or forward in landing, whereby the hazard of a bad landing is eliminated.

While I have illustrated and described the preferred form of construction for carrying my invention into effect, it is to be understood that variations and modifications may be made without departing from the spirit of my invention.

I, therefore, do not wish to be limited to the precise details of construction set forth but desire to avail myself of such variations and modifications as come within the scope of the appended claims.

Claims:

1. A parachute comprising a canopy of non-circular contour, suspension lines of equal lengths attached to said canopy and extending downwardly to support a load at their lower ends and means on one side of said canopy to permit the air to vent laterally therefrom and propel said parachute substantially horizontally while descending, the canopy being so shaped as to carry the load forward of the center of area thereof.

2. The combination with a main parachute and a pilot parachute therefor, of means forming a part of said main parachute and attached to said pilot parachute providing a valve mechanism which is automatically opened at high shock loads and which remains closed at low shock loads.

3. The combination with a main parachute and a pilot parachute therefor of a vent mechanism provided in the top of the main parachute having connection with the pilot parachute so arranged as to remain closed at low shock loads and automatically opened at high shock loads.

4. The combination with a parachute having motion of translation, of suspension members connecting said parachute to a harness so that an aviator in said harness faces in a direction at right angles to the motion of translation of the parachute.

5. A parachute comprising a canopy formed from a flat sheet of material, the shape of which is generally that of a symmetrical trapezoid with the corners rounded at the ends of its longer base, and arcuate bulges near the center of the periphery of the longer base and along the periphery of its two sides.

6. A parachute comprising a canopy having a flat single sustaining surface, suspension lines attached to said canopy and means offset from the center of the area of said canopy when inflated for laterally venting the air from the side thereof to propel said parachute substantially horizontally.

7. A parachute canopy of irregular polygonal shape having a plurality of bulged portions at the periphery thereof, tension elements radiating from a common center and terminating at the periphery of certain of the bulged portions, and suspension elements attached to these points.

8. A parachute having a single flat sustaining surface and a plurality of sides, suspension elements to support a load, said suspension elements attached to the canopy on all but one side thereof whereby when said canopy is inflated a tunnel-like vent will form on this particular side to impart a horizontal motion thereto when descending.

In testimony whereof I affix my signature.

EDWARD L. HOFFMAN.